(12) United States Patent
Leistner et al.

(10) Patent No.: US 8,151,566 B2
(45) Date of Patent: Apr. 10, 2012

(54) CHARGE AIR COOLING SYSTEM AND METHOD

(75) Inventors: Don Leistner, Bradford, OH (US);
 Jason Wackler, Picqua, OH (US); Nat Phillips, Tipp City, OH (US)

(73) Assignee: Illinois Tool Works Inc., Glenview, IL (US)

( * ) Notice: Subject to any disclaimer, the term of this patent is extended or adjusted under 35 U.S.C. 154(b) by 1590 days.

(21) Appl. No.: 11/257,298

(22) Filed: Oct. 24, 2005

(65) Prior Publication Data

US 2007/0089411 A1    Apr. 26, 2007

(51) Int. Cl.
 *F02B 29/04* (2006.01)
(52) U.S. Cl. ........................................................ 60/599
(58) Field of Classification Search .................. 123/563, 123/2; 60/599
 See application file for complete search history.

(56) References Cited

U.S. PATENT DOCUMENTS

| | | | | |
|---|---|---|---|---|
| 4,548,164 A | * | 10/1985 | Ylonen et al. | 123/2 |
| 4,883,024 A | * | 11/1989 | Ito et al. | 123/41.7 |
| 5,007,383 A | * | 4/1991 | Ito et al. | 123/41.49 |
| 5,642,702 A | * | 7/1997 | Kouchi et al. | 123/198 E |
| 5,694,889 A | * | 12/1997 | Ball et al. | 123/41.7 |
| 5,731,687 A | * | 3/1998 | Hirano et al. | 322/1 |
| 5,890,460 A | * | 4/1999 | Ball et al. | 123/41.7 |
| 6,134,878 A | * | 10/2000 | Amako et al. | 60/801 |
| 6,424,891 B1 | * | 7/2002 | Sargent et al. | 701/29 |
| 6,491,133 B2 | * | 12/2002 | Yamada et al. | 181/200 |
| 7,107,943 B2 | * | 9/2006 | Yasuda et al. | 123/41.62 |
| 2005/0013704 A1 | * | 1/2005 | Dyson et al. | 417/364 |

FOREIGN PATENT DOCUMENTS

| | | |
|---|---|---|
| DE | 34 23 867 A1 | 1/1986 |
| DE | 10 2004 02486 A1 | 12/2004 |
| EP | 0 886 046 A1 | 12/1998 |
| EP | 1 143 125 A | 10/2001 |

* cited by examiner

*Primary Examiner* — Thai Ba Trieu
(74) *Attorney, Agent, or Firm* — Fletcher Yoder PC (57) ABSTRACT

In accordance with one embodiment, the present techniques relate to a ground power unit that supplies electricity to an aircraft. The ground power unit may include a generator coupled to a diesel piston engine. A turbocharger may precompress the air consumed by the diesel engine, and a charge air cooler may cool this air before it is introduced to the diesel engine. The charge air cooler may be placed upstream from the diesel engine in a primary air flow. Advantageously, drawing air through the charge air cooler that has not first passed over the engine may lower the operating temperature of the ground power unit.

23 Claims, 4 Drawing Sheets

CHARGE AIR COOLING SYSTEM AND METHOD

BACKGROUND

The invention relates generally to ground power units employing a charge air cooler. More particularly, the invention relates to a ground power unit with an engine placed upstream from a charge air cooler in a primary air flow path.

Ground power units (GPUs) supply electric power to aircraft when the craft are parked at a terminal, hangar, or other stationary location. Often, GPUs power electrical systems on an aircraft when the aircraft's electric power generation system is disabled. Typically, an aircraft generates electric power by drawing power from its engines. To conserve fuel, pilots turn the engines off when the aircraft is on the ground. However, components in the aircraft often consume electric power while the aircraft is on the ground. For example, a pilot may operate an onboard air conditioning system, communications equipment, lighting, avionics, or other systems when the aircraft's engines are turned off. Thus, when the aircraft is on the ground, it is often connected to a GPU. Typically, a GPU generates electric power that at least partially satisfies the aircraft's needs. The aircraft's electrical systems may continue to operate with power supplied by the GPU, even when the aircraft's engines are turned off. Thus, a GPU may supplement an aircraft's onboard electric power generation system.

Frequently, a GPU includes a stand-alone electric power generation system. For instance, GPUs often include a diesel engine and a generator, wherein the engine drives the generator, creating electrical power. Together, the engine and generator power the operation of electrical systems on the aircraft.

Certain GPUs employ a turbocharger that enhances the emissions performance of the diesel engine. To drive the generator, a diesel engine combusts an air-fuel mixture. A turbocharger may enhance the efficiency of the combustion process. The turbocharger pre-compresses the intake air before the air is introduced into the engine. The engine mixes the pre-compressed intake air with fuel in the cylinders of the engine (in the case of a diesel generator set). Typically, a piston further compresses the air-fuel mixture, which is then combusted. Advantageously, because the intake air is pre-compressed, an engine with a turbocharger may achieve higher pressures in the combustion chamber. Combustion at a higher pressure burns the fuel more completely, reducing emissions.

Typically, as the turbocharger compresses the air, the temperature of the air rises. The compressed air confines this thermal energy of the air circulated through the turbocharger into a smaller volume, raising the air temperature. This thermal energy may increase the heat that the engine must dissipate. Additionally, higher temperature air is less dense than lower temperature air at the same pressure. Lower density air may reduce the effectiveness of pre-compressing the air, as less air enters the combustion chamber. Thus, it may be desirable to cool the pre-compressed air after it leaves the turbocharger.

To enhance the effectiveness of a turbocharger, a GPU often includes a charge air cooler (CAC). The CAC cools the pre-compressed air before it is introduced into the engine. Typically, the pre-compressed air flows through the CAC after (i.e., downstream of) the turbocharger. To cool the pre-compressed air, the CAC typically includes an air-to-air heat exchanger. Often, in addition to the pre-compressed air flowing inside a CAC, a cooling stream of air flows over the CAC. The cooling stream of air removes heat from the pre-compressed air through the air-to-air heat exchanger. The CAC maintains these two air flows separate while facilitating heat exchange between them. Finally, the cooled pre-compressed air flows out of the CAC and into the intake manifold of the engine.

Typically, designers of GPUs desire to reduce the engine's operating temperature without increasing engine noise. Higher operating temperatures can increase wear on the engine components, and engine noise may irritate aircraft passengers and aircraft technicians. Thus, designers may attempt to reduce both engine temperature and noise.

However, these objectives, lower noise emissions and lower operating temperatures, frequently contravene one another. Typically, waste heat energy constitutes much of the energy released by the combustion of fuel in the engine. Designers typically take steps to dissipate this waste heat, such as including a radiator and an air circulation system. However, more powerful air circulation systems often generate more noise. What is more, larger vents associated with greater air circulation often permit more engine noise to escape from the GPU. As a result, designers of GPUs often make tradeoffs between noise emissions and engine temperature.

There is a need, therefore, for an improved design for GPUs, and particularly for turbocharger systems, that permit better cooling of turbocharged air, while maintaining reduced noise levels.

BRIEF DESCRIPTION

There is provided an apparatus, including a generator, an engine mechanically coupled to the generator and having an air intake, wherein the engine is placed in a primary air flow path, an air compressor having an intake and a discharge, wherein the air compressor is configured to receive air through the intake, compress the air, and output a pre-compressed air flow through the discharge, and a charge air cooler having a charge air cooler intake coupled in fluid communication with the discharge of the air compressor and a charge air cooler discharge coupled in fluid communication with the air intake of the engine, wherein the charge air cooler is configured to exchange heat between the pre-compressed air flow and the primary air flow path, and wherein the charge air cooler is positioned upstream from the engine in the primary air flow path.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
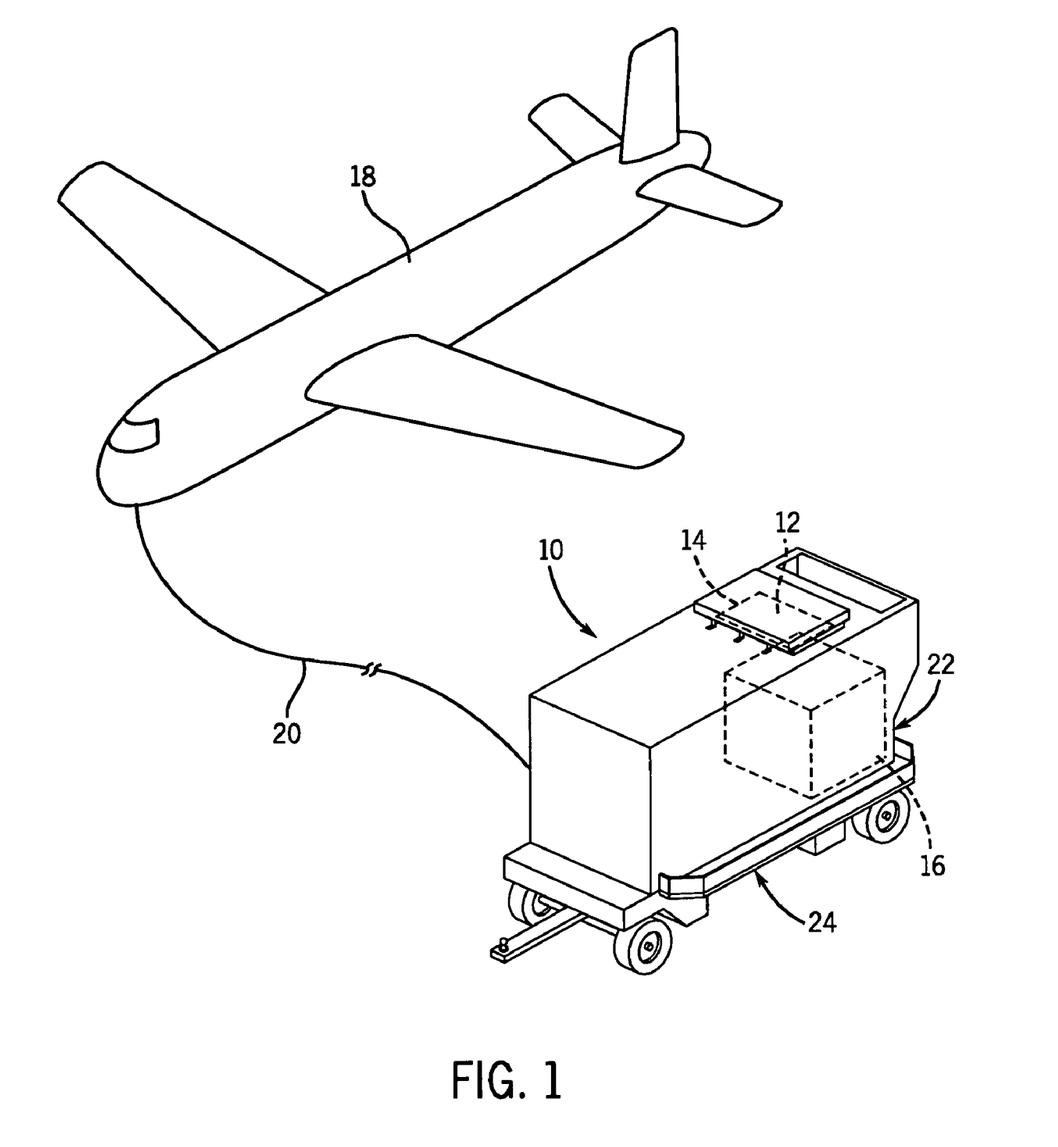
FIG. 1 is a perspective view of an aircraft coupled to an exemplary GPU incorporating a charge air cooling and air flow arrangement in accordance with the present techniques.

Turning initially to FIG. 1, a perspective view is shown of an exemplary GPU 10 in accordance with the present techniques. As is discussed in greater detail below, the illustrated embodiment includes a CAC 12 placed between a primary air intake 14 and an engine 16. The CAC 12 cools pre-compressed air that enters the engine. At the same time, air flows through the primary air intake 14. This air flow removes heat from the engine 16 and the pre-compressed air within the CAC 12. Advantageously, as is subsequently explained, placing the CAC 12 between the primary air intake 14 and the engine 16 lowers the operating temperature of the GPU 10. Moreover, such an arrangement achieves lower operating temperatures without increasing the noise emitted by the GPU 10. In other words, placing the CAC 12 upstream from the engine 16 enhances the operation of the GPU 10, as is explained in greater detail below.

FIG. 1 illustrates the exemplary GPU 10 electrically coupled to an aircraft 18. The aircraft 18 may be any sort of aircraft that is configured to receive power from the GPU 10. For example, the aircraft 18 may be any sort of commercial, private, or military aircraft. While the illustrated aircraft 18 is an airplane, those skilled in the art will appreciate that other types of aircraft 18 may draw power from a GPU 10, such as a helicopter, spacecraft, missile, dirigible, or glider, for instance. Moreover, the GPU may provide power at any suitable output voltage, current and frequency, as dictated by the particular design of the aircraft electrical system.

In the illustrated embodiment, a cable 20 connects the GPU 10 to the aircraft 18. The cable 20 conducts electrical current between the GPU 10 and the aircraft 18, delivering electrical power. The cable 20 may be configured to conduct three-phase electrical power. In certain applications, direct current power may be applied to the aircraft.

The exemplary GPU 10 of FIG. 1 includes a housing 22. The housing 22 may be made of sheet metal to protect subsequently discussed internal components from the weather, as the GPU 10 may be used outdoors. However, it should be noted that other embodiments in accordance with the present techniques may employ other materials in the housing 22, such as fiberglass, cloth, wood, or plastic, for example. Additionally, the housing 22 may dampen noises emitted by the subsequently discussed internal components, such as the engine 16. To this end, the housing 22 may partially or wholly envelope these internal components. At the same time, the housing 22 may include various subsequently discussed apertures to permit air to flow through the GPU 10, cooling the internal components. As discussed below, such air channeling by the housing and associated components (intakes, baffles, etc.) may greatly aid in obtaining desired temperatures, temperature gradients, and noise levels.

As depicted by FIG. 1, the illustrated embodiment includes a chassis assembly 24. The chassis assembly 24 may serve several functions, such as facilitating movement of the GPU 10, supporting the housing 22, and supporting the components within the housing 22. These functions and the components of the chassis assembly 24 that perform them are discussed in greater detail below. For now, it is sufficient to note that the chassis assembly 24 may couple to the housing 22 and facilitate movement of the GPU 10. Advantageously, a single moveable GPU 10 may serve a number of aircraft 18 in different locations, moving from one aircraft 18 to the next as needed.

Figure 2:
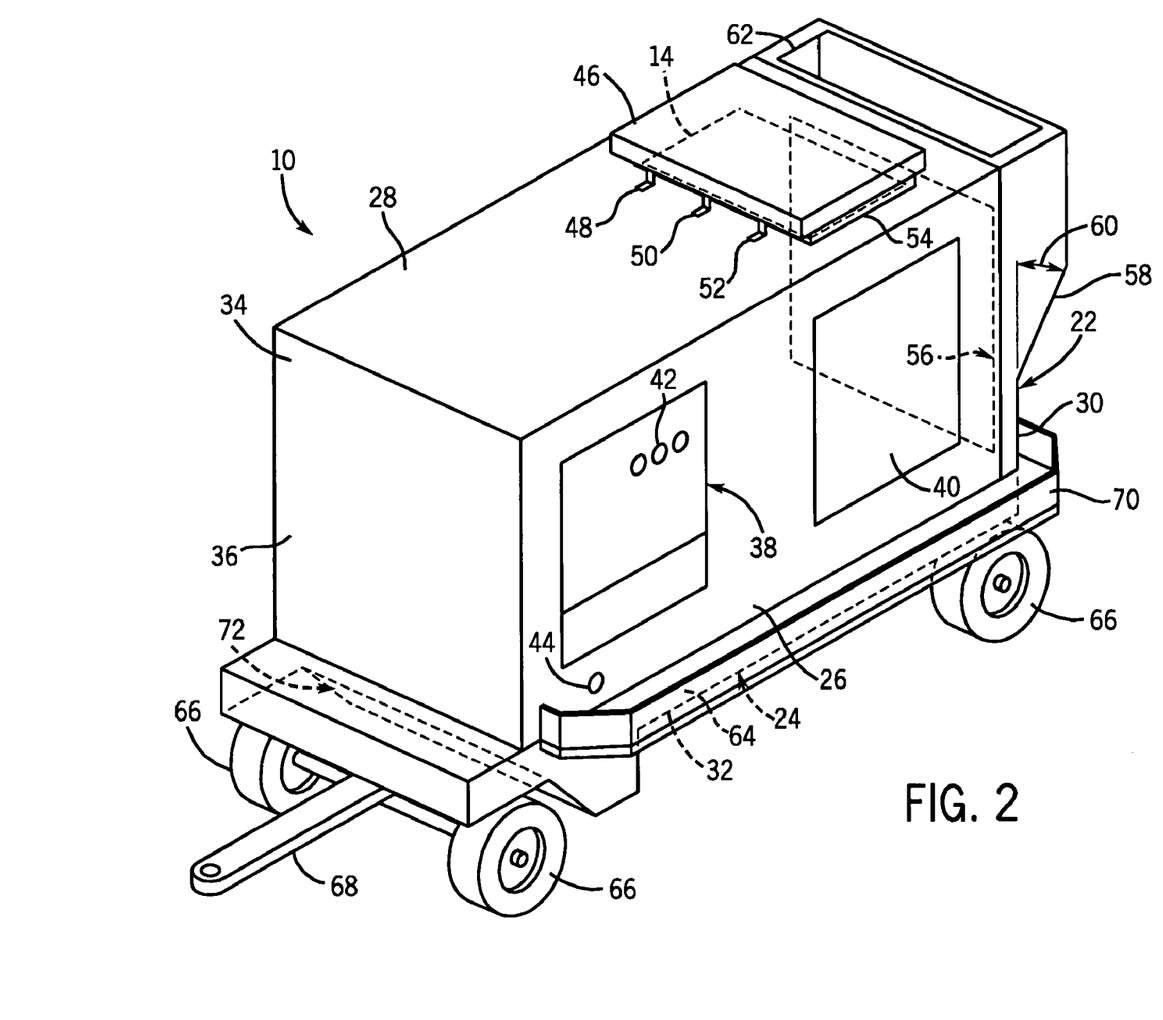
FIG. 2 is a detailed perspective view of the left face of the exemplary GPU of FIG. 1.

Turning to FIG. 2, a detailed perspective view of an exemplary GPU 10 is shown. The housing 22 may include several faces that shroud internal components. In the illustrated embodiment, the housing 22 includes a left face 26, a top face 28, a rear face 30, a bottom face 32, a right face 34, and a front face 36. Together, these faces 26-36 may form a generally box-shaped housing 22. However, as will be appreciated by those skilled in the art, other embodiments may employ a housing 22 with a different shape.

The left face 26 of the illustrated embodiment includes several components that facilitate use of the GPU 10. For instance, a control panel 38 is located on the left face 26 of the present embodiment. Additionally, a left engine access panel 40 may provide access to the engine 16. Advantageously, the left engine access panel may be removed or displaced by a mechanic to perform maintenance operations on the engine 16.

The control panel 38 of the illustrated embodiment includes gauges 42 and a connector 44. The gauges 42 may visually indicate various system parameters, such as temperature, oil pressure, fuel level, or rotations-per-minute, for example. The gauges 42 may be analog or digital. The connector 44 may electrically couple to the cable 20. As shown in FIG. 1, the GPU 10 may deliver power to an aircraft 18 through cable 20. Thus, the aircraft 18 may connect to the GPU 10 through the connector 44. Other controls and visual indicators may be provided for control of the electrical parameters of the generator, such as voltage, current, frequency, and so forth, as well as for making or breaking contact (i.e., switching on and off) between the generator output and the connector.

The top face 28 may include a primary air intake 14. The primary air intake 14 of the present embodiment is a generally rectangular aperture in the top face 28. To display the primary air intake 14 clearly, the CAC 12 is not shown in FIG. 2. However, other embodiments may employ primary air intakes 14 with a different shape and/or primary air intakes 14 located on a different face of the housing 22. As is described in more detail below, air may flow through the primary air intake 14 and into the housing 22.

In the illustrated embodiment, the top face 28 of the housing 22 includes various components to support the operation of the primary air intake 14. For instance, a cover or hat 46, hat supports 48-52, and weather shield 54 may couple to the top face 28. The supports 48-52 may couple the hat 46 to the top face 28, and the weather shield 54 may couple directly to the top face 28. As is described below, these components may cooperate to shield the primary air intake 14 from debris.

The hat 46 of the present embodiment covers the primary air intake 14 without blocking air flow. Thus, the hat 46 may be generally of the same shape as the primary air intake 14, though slightly larger. For instance, the hat 46 may be generally rectangular. Advantageously, the hat 46 prevents debris and rain from entering the primary air intake 14. At the same time, air may flow around the hat 46 to enter the primary air intake 14. Additionally, the hat 46 may absorb or reflect noise energy emitted by components within the housing 22, such as the engine 16. Thus, the hat 46 may muffle engine noise and block debris without sealing off air flows into the primary air intake 14.

The supports 48-52 may space the hat 46 away from the top face 28. While FIG. 2 depicts three supports 48-52, the present embodiment employs three additional supports symmetrically disposed about the hat 46 (not shown). However, other embodiments in accordance with the present techniques may employ more or fewer supports 48-56. The exemplary hat 46 couples to the top face 28 through the supports 48-52, leaving a gap (not shown) between the hat 46 and the weather shield 54, through which air may flow.

In the illustrated embodiment, an exemplary weather shield 54 surrounds the primary air intake 14. The weather shield 54 may extend orthogonally from the top face 28 to a height that leaves a gap under the hat 46. The exemplary weather shield 54 lies under the hat 46 and blocks debris from entering the primary air intake 14. The weather shield 54 may also muffle noise emitted by components within the housing 22.

Air entering the primary air intake 14 of the present embodiment flows through these structures 46-54. To enter this exemplary housing 22, air flows between the supports 48-52, under the hat 46, over the weather shield 54, and through the primary air intake 14. As is discussed in greater detail below, air flowing through the primary air intake 14 may also flow through a CAC 12, cooling a pre-compressed air flow.

The rear face 30 of the illustrated embodiment includes features that permit air to exit the housing 22. An air outlet 56 is located on the rear face 30 of the illustrated embodiment. Air leaving the housing 22 flows through the air outlet 56. As is discussed in greater detail below, this air may carry heat away from the GPU 10, cooling the GPU internal components.

Additionally, the rear face 30 of the present embodiment supports a noise plenum 58. The noise plenum 58 attaches over the air outlet 56 and muffles noise from the components within the housing 22. The noise plenum 58 may include a surface sloped at an angle 60, and an aperture 62. The surface sloped at angle 60 may deflect sound energy upward, away from users. The aperture 60 may permit air to exit the noise plenum 58. Thus, air leaving the housing 22 of the illustrated embodiment flows through the air outlet 56 and out the aperture 62 of the noise plenum 58.

As will be appreciated by those skilled in the art, other embodiments may employ a noise plenum 58 with a different shape. For example, the noise plenum 58 may be any structure configured to muffle sounds emitted from within the housing 22 while still permitting air to flow out of the air outlet 56. Alternatively, certain embodiments in accordance with the present techniques may not employ a noise plenum 58, leaving the air outlet 56 exposed.

The bottom face 32 of the housing 22 in the illustrated embodiment couples to a chassis assembly 24. The illustrated chassis assembly 24 includes a chassis 64, a number of wheels 66, a tow bar 68, and a bumper 70. The chassis 64 may couple to the bottom face 32 or function as a bottom face 32. The wheels 66 of the current embodiment support the chassis and provide mobility to the GPU 10. The tow bar 68 couples to the chassis 64. Advantageously, a service vehicle (not shown) may move the GPU 10 by pulling the tow bar 68. A bumper 70 couples to the chassis 64 and surrounds it. The wheels 66 and tow bar 68 facilitate moving the GPU 10 between aircraft 18, and the bumper 70 protects the GPU 10 in the event of a collision.

The bottom face 32 may include a secondary air intake 72. In the current embodiment, the secondary air intake 72 conducts a secondary air flow, which is discussed in greater detail below. It will be appreciated that certain embodiments in accordance with the present techniques may not employ a secondary air intake 72 or employ a secondary air intake 72 in a different location.

Figure 3:
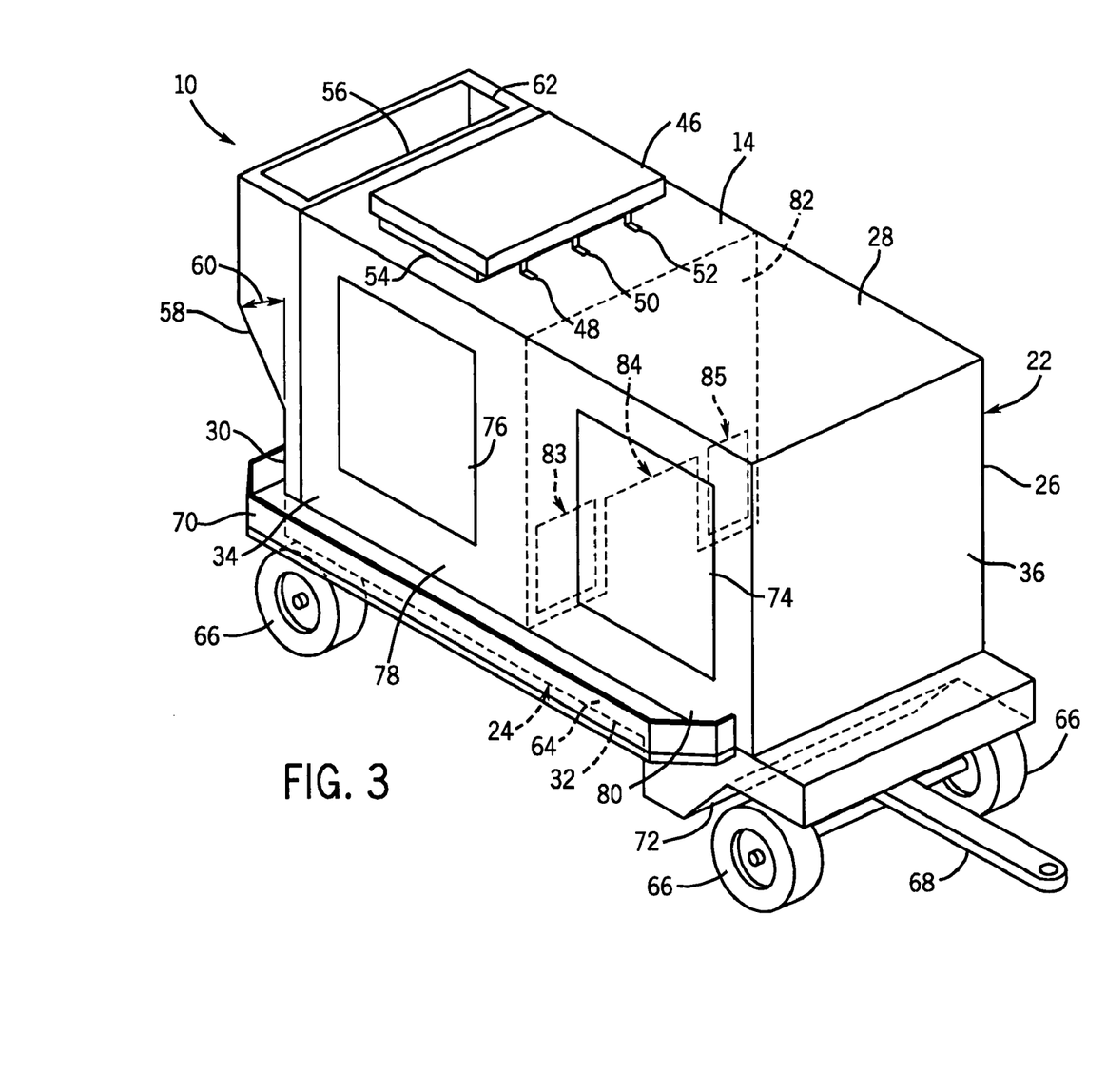
FIG. 3 is a detailed perspective view of the right face of the exemplary GPU of FIG. 1.

FIG. 3 is a perspective view of the right face 34 of an exemplary GPU 10. The right face 34 of the present embodiment includes a right generator access panel 74 and a right engine access panel 76. These panels 74 and 76 may be removed or displaced during maintenance operations to provide access to components within the housing 22.

The housing 22 of the illustrated embodiment is divided into compartments. An engine compartment 78 resides next to a generator compartment 80. The engine compartment 78 holds the engine 16, and the generator compartment 80 holds a generator, which is discussed below. A bulkhead 82 divides the compartments of the current embodiment. As illustrated by FIG. 3, the bulkhead 82 may be substantially parallel to the front face 36 of the housing 22. Moreover, the bulkhead 82 may extend between the left face 26, the right face 34, the top face 28, and the bottom face 32. The illustrated bulkhead 82 includes bulkhead apertures 83-85. The bulkhead apertures 83-85 provide an opening between the engine compartment 78 and the generator compartment 80. As is discussed in greater detail below, air may flow through the bulkhead apertures 83-85 from the generator compartment 80 to the engine compartment 78.

Figure 4:
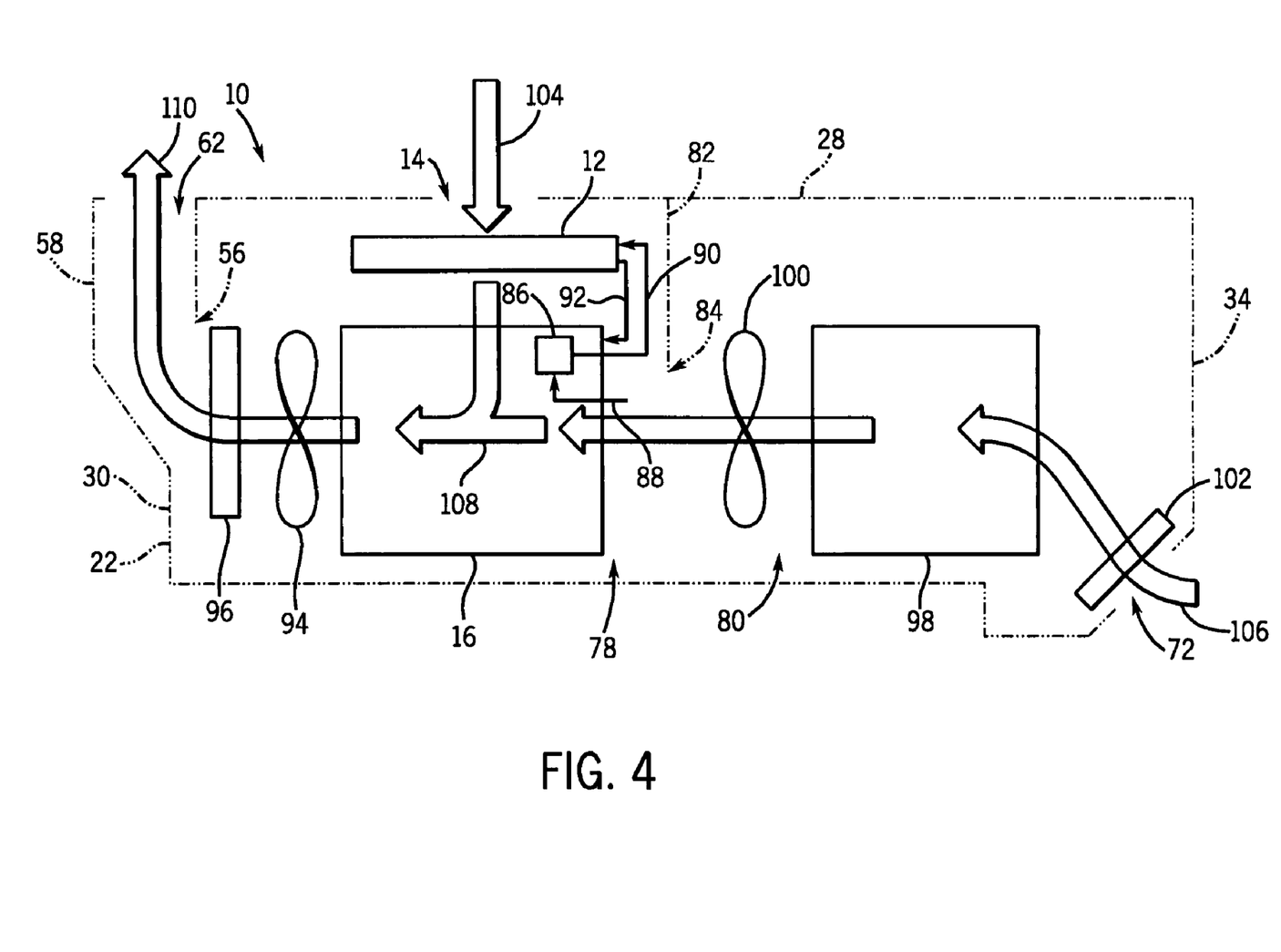
FIG. 4 is a graphical representation of air flows within the exemplary GPU of the preceding figures.

FIG. 4 is a graphical representation of various air flows and components within the housing 22. For instance, engine 16 is disposed in the engine compartment 78. In the illustrated embodiment, the engine 16 is a diesel engine. However, other embodiments may employ engines configured to combust other fuels, such as jet fuels, for example. The diesel engine 16 of the present embodiment is an internal combustion engine.

An air compressor 86 supplies pre-compressed air to the engine 16. In the illustrated embodiment, the air compressor 86 is a turbocharger. The air compressor 86 of the present embodiment mounts to the side of the engine 16, but other embodiments may employ an air compressor 86 coupled to another portion of the GPU 10. Additionally, the air compressor 86 includes an air compressor intake 88 to receive the air that it will compress.

In the illustrated embodiment, a CAC 12 cools the air that is compressed by the air compressor 86. To this end, in a present embodiment, the CAC 12 is an air-to-air heat exchanger. However, other embodiments may employ an air-to-liquid-to-air heat exchanger, such as an intercooler. The CAC 12 may couple to the air compressor 86 through a CAC input line 90. The CAC 12 receives high-temperature pre-compressed air from the air compressor 86 through the CAC input line 90, and cools this pre-compressed air before delivering it to the engine 16 through a CAC output line 92. The CAC output line 92 may couple to an air intake (not shown) on the engine 16, such as an intake manifold. The air flowing inside the CAC 12, from the air compressor 86 to the engine 16, is referred to as the "pre-compressed air flow." In contrast, the air flowing through the CAC 12, removing heat from the pre-compressed air flow, is referred to as the "primary air flow."

The CAC 12 is disposed between the engine 16 and the primary air intake 14. In the illustrated embodiment, the primary air intake 14 is above the engine 16, as is the CAC 12. However, as will be appreciated, other embodiments may employ a CAC 12 in other positions relative to the engine. Advantageously, as is discussed further below in reference to the temperature of the air flows within the housing 22, it has been found that placing the CAC 12 between the primary air intake 14 and the engine 16 increases the effectiveness of the CAC 12.

The GPU 10 of the present embodiment includes an engine fan 94. The engine fan 94 drives air through the housing 22. To this end, the engine fan 94 may be a propeller-type fan or a centrifugal fan, for example. The engine fan 94 may couple to the engine 16 through, for instance, a belt and pulley system (not shown).

In the illustrated embodiment, a radiator 96 cools the engine 16. The radiator 96 may be a liquid-to-air heat exchanger, for instance. The engine 16 may include a water pump (not shown) that circulates a coolant, such as antifreeze and/or water, through the radiator. This coolant may carry heat from the engine 16. The radiator 96 may remove heat from the coolant, transferring thermal energy into the air.

To this end, the radiator 96 may include an array of tubes and fins to increase its surface area. The lower-temperature coolant exiting the radiator 96 may circulate back into the engine 16 to remove additional heat from the engine 16. To increase air flow over the radiator 96, the radiator 96 is disposed near (i.e., adjacent to) the engine fan 94, for example immediately upstream or downstream of the engine fan 94.

As illustrated by FIG. 4, the GPU 10 of the present embodiment includes a generator 98. The generator 98 may convert mechanical energy from the engine 16 into electrical energy for aircraft 18. The generator 98 receives mechanical energy from the engine 16 through a drive shaft, belt, chain, or other mechanism for transmitting mechanical energy. The device transferring mechanical energy between the engine 16 and the generator 98 may pass through the bulkhead aperture 84. The generator compartment 80 houses the generator 98. The generator 98 may be configured in accordance with certain standards employed in the manufacture of GPUs and aircraft electrical systems. For example, the GPU 10 may deliver 115 volt electrical power with three phases of 400 Hz alternating current. The generator 98 is electrically couple to the connector 44 as described above.

A generator fan 100 may displace air near the generator 98. The generator fan 100 may be disposed between the generator 98 and the engine 16. To circulate air, the generator fan 98 may be a propeller-type fan or a centrifugal fan, for example. Advantageously, the air displaced by the generator fan 100 may carry heat away from the generator 98.

A noise dampener 102 may suppress noise energy emitted by components within the GPU 10. The noise dampener 102 may be disposed proximate to or in the secondary intake 72. The noise dampener 102, when present, is configured to dampen noises while conducting an air flow that cools the generator 98.

The engine fan 94 and generator fan 100 may drive various air flows through the housing 22. For example, a primary air flow 104 may flow into the housing 22 from outside. The primary air flow 104 may pass through the primary air intake 14. To enter the primary air intake 14, the primary air flow 104 may pass under the hat 46 and over the weather shield 54. Further upstream, the primary air flow 104 may pass through the CAC 12, removing heat energy from the pre-compressed air flow. After passing through the CAC 12, the primary air flow 104 may pass over the engine 16, removing still more heat energy from the engine 16. A pressure differential across the engine fan 94 may drive the primary air flow 104.

A secondary air flow 106 may pass through the generator compartment 80. The secondary air flow 106 of the illustrated embodiment enters the housing 22 through the secondary air intake 72. The secondary air flow 106 may pass through the noise dampener 102 and into the generator compartment 80. Further upstream, the secondary air flow 106 may pass over the generator 98, removing heat energy from the generator 98. The secondary air flow 106 may then enter the engine compartment 78 through the bulkhead apertures 83-85. A pressure differential created by the generator fan 94 may drive the secondary air flow 106. It should be noted that some embodiments in accordance with the present techniques may not employ a secondary air flow 106 or may employ additionally air flows.

Once in the engine compartment 78, the secondary air flow 106 may merge with the primary air flow 104, forming a combined air flow 108. The combined air flow 108 may flow over the engine 16 and through the radiator 96. The primary air flow 104 and the secondary air flow 106 may both contribute to the volumetric flow rate of the combined air flow 108. For example, in a presently contemplated arrangement, the secondary air flow 106 contributes approximately 20% of the air flowing in the combined air flow 108, and the primary air flow 104 contributes approximately 80%. However, in other embodiments, the ratio of contribution may be different.

The combined air flow 108 of the present embodiment transitions into an outlet air flow 110 when it passes through the radiator 96. The outlet air flow 110 may pass through the noise plenum 58, turning upwards. The outlet air flow 110 may then exit the housing 22, carrying heat energy from the components within the housing 22 with it.

In operation, these air flows 104-110 may remove heat from components within the housing 22. For instance, the primary air flow 104 may remove heat from the CAC 12, the engine 16, and the radiator 96. When it enters the housing 22, the primary air flow 104 may be near an ambient temperature, as it is drawn from outside the GPU 10. The ambient temperature air may pass through the CAC 12, exchanging heat with the pre-compressed air flow inside the CAC 12. As previously mentioned, the pre-compressed air flow may have an elevated temperature as it leaves the air compressor 86. Thus, the primary air flow 104 may cool the pre-compressed air flow in the CAC 12. At the same time, the temperature of the primary air flow 104 may rise due to the heat energy removed from the pre-compressed air flow.

Advantageously, drawing fresh air, e.g. the primary air flow 104 before it passes over other components giving off heat, through the CAC 12 may increase its efficiency. The effectiveness of a CAC 12 may depend, in part, on the temperature differential between the cooling fluid and the cooled fluid. A larger temperature differential often results in more heat being removed from the cooled fluid. That is, drawing cooler air through the CAC 12 may lower the temperature of the pre-compressed air flow to a greater degree than drawing warmer air through the CAC 12. Fresh air from outside the GPU 10 is likely to be cooler than air inside the GPU 10. Air circulating within the GPU 10 may have passed over components that expel thermal energy, such as the engine 16, generator 98, and radiator 96, raising the air temperature. Thus, the CAC 12 of the present embodiment may cool the pre-compressed air flow to a relatively low temperature, due to the relatively low temperature of fresh air. That is, directing fresh air over the CAC 12 may increase the effectiveness of the CAC 12 relative to a CAC 12 drawing pre-heated air from within the housing 22. In some embodiments, the engine 16 realizes a 10 to 15 C reduction in air-to-boil temperature when fresh air is directed over the CAC 12. In short, placing the CAC 12 upstream from the engine 16, in the primary air flow 104, may lower the operating temperature of the GPU 10.

Moreover, placing the CAC 12 and the primary air intake 14 above the engine may result in quieter operation of the GPU 10. It is believed that noise energy that escapes through the primary air intake 14 radiated upward, away from users on the ground. Thus, users may perceive the current embodiment to be quieter than a GPU 10 with a primary air intake 14 on the bottom face 32 for instance. In some embodiments, users perceive 1 to 2 fewer decibels of sound energy when the primary air intake 14 is moved to the top face 28 from the bottom face 32.

Turning to the other air flows, the secondary air flow 106 may also remove heat from components. For instance, the secondary air flow may pass over the generator 98 and the engine 16, removing heat from both.

The combined air flow 108 cool fluids circulating within the radiator 96. Again, the combined air flow 108 of the present embodiment is an aggregation of the primary air flow 104 and the secondary air flow 106. The combined air flow 108 passes through the radiator 96, removing heat from the coolant in the radiator 96, which, in turn, cools the engine 16.

The outlet air flow 110 of the current embodiment carries the heated air in the combined air flow 108 out of the GPU 10. The outlet air flow 110 will be at a higher temperature than the ambient air that entered the GPU 10, indicating a net transfer of heat energy out of the GPU 10. Thus, the air flows 104-110 remove heat from the GPU 10, cooling its internal components.

It should be noted that the present techniques are not limited to embodiments with a CAC 12 positioned above the engine 16. For example, the CAC 12 may be placed elsewhere in or on the GPU 10. In many of these embodiments, the primary air flow 104 may pass through the CAC 12, over the engine 16, and through the radiator 96, in sequence. Alternatively, the primary air flow 104 may pass through the CAC 12, through the radiator 96, and over the engine 16, in sequence.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of manufacturing an apparatus, comprising:
drivingly coupling a diesel engine to an electrical generator configured to generate output electrical power when driven by the diesel engine;
coupling an air compressor to the diesel engine, the air compressor being configured to supply the piston engine with a pre-compressed air flow;
coupling a charge air cooler in an air path between the air compressor and the diesel engine, the charge air cooler being configured to cool the pre-compressed air flow; and
disposing a first fan adjacent to the diesel engine to drive air over the diesel engine in a primary air flow path;
wherein the charge air cooler is positioned upstream from the engine in the primary air flow path.

2. The method of claim 1, comprising disposing a radiator downstream of the charge air cooler in the primary air flow path.

3. The method of claim 2, wherein the charge air cooler is disposed above the engine.

4. The method of claim 1, comprising:
disposing a second fan with respect to the electrical generator and the engine to drive air in a secondary air flow path over the generator and the engine, wherein the electrical generator is upstream of the engine in the secondary air flow path.

5. An apparatus, comprising:
an electrical generator;
an engine mechanically coupled to the electrical generator and having an air intake, wherein the engine is placed in a primary air flow path;
an air compressor having an intake and a discharge, wherein the air compressor is configured to receive air through the intake, compress the air, and output a pre-compressed air flow through the discharge; and
a charge air cooler having a charge air cooler intake coupled in fluid communication with the discharge of the air compressor and a charge air cooler discharge coupled in fluid communication with the air intake of the engine, wherein the charge air cooler is configured to exchange heat between the pre-compressed air flow and the primary air flow path, and wherein the charge air cooler is positioned upstream from the engine in the primary air flow path.

6. The apparatus of claim 5, comprising a radiator coupled to the engine and positioned downstream from the charge air cooler in the primary air flow path.

7. The apparatus of claim 6, wherein the radiator is positioned downstream from the engine in the primary air flow path.

8. The apparatus of claim 5, comprising:
a chassis coupled to the engine and the electrical generator;
wheels rotatably coupled to the chassis; and
a tow bar coupled to the chassis.

9. The apparatus of claim 5, comprising an engine fan configured to drive air in the primary air flow path.

10. The apparatus of claim 5, wherein the electrical generator is configured to generate 115-volt, three phase, 400 Hz alternating current power.

11. The apparatus of claim 5, comprising a housing disposed substantially around the engine and electrical generator, wherein the housing comprises:
a top face;
a rear face that is substantially orthogonal to the top face;
a primary air intake; and
an air outlet, and wherein the primary air flow path passes through the primary air intake and out the air outlet.

12. The apparatus of claim 11, wherein the primary air intake is in the top face of the housing.

13. The apparatus of claim 11, comprising a hat coupled to the housing and covering the primary air intake, wherein air in the primary air flow path flows around the hat and through the primary air intake.

14. The apparatus of claim 13, comprising a weather shield coupled to the housing under the hat and around the primary air intake.

15. The apparatus of claim 11, wherein the air outlet is on the rear face of the housing.

16. The apparatus of claim 11, comprising a noise plenum coupled to the housing and covering the air outlet.

17. The apparatus of claim 11, comprising a bulkhead disposed within the housing between the electrical generator and the engine.

18. The apparatus of claim 5, wherein the electrical generator is positioned upstream from the engine in a secondary air flow path.

19. The apparatus of claim 18, wherein the volumetric flow rate of air in the secondary air flow path is less than ½ the volumetric flow rate of air in the primary air flow path.

20. The apparatus of claim 5, wherein the air compressor comprises a turbocharger.

21. The apparatus of claim 5, wherein the engine comprises a piston-driven internal combustion diesel engine.

22. An apparatus for providing electrical power to an aircraft, comprising:
an electrical generator;
an engine mechanically coupled to the generator and having an air intake;
an air compressor having an intake and a discharge, wherein the air compressor is configured to receive air through the intake, compress the air, and output a pre-compressed air flow through the discharge;
a charge air cooler having a charge air cooler intake coupled in fluid communication with the discharge of the air compressor and a charge air cooler discharge coupled in fluid communication with the air intake of the engine, wherein the charge air cooler is configured to cool the pre-compressed air flow prior to introduction into the air intake;

a radiator coupled to the engine for cooling the engine; and an engine fan configured to drive air over the radiator;

wherein cooling air flows first through the charge air cooler, then over the engine, then through the radiator.

23. The apparatus of claim 22, wherein cooling air also flows over the electrical generator and joins the cooling air flowing over the engine prior to flowing through the radiator.

\* \* \* \* \*